J. A., I. E. & W. R. FRASER.
STEERING DEVICE FOR TRACTION ENGINES.
APPLICATION FILED MAY 22, 1913.
1,097,174.
Patented May 19, 1914.
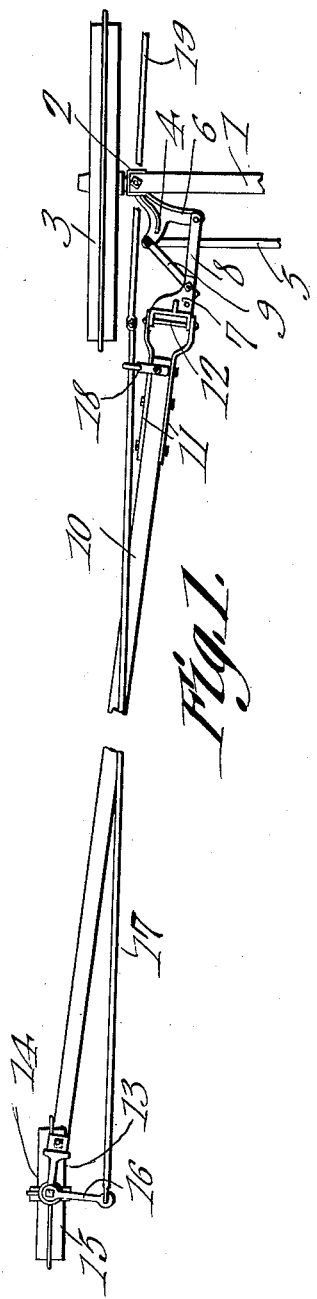
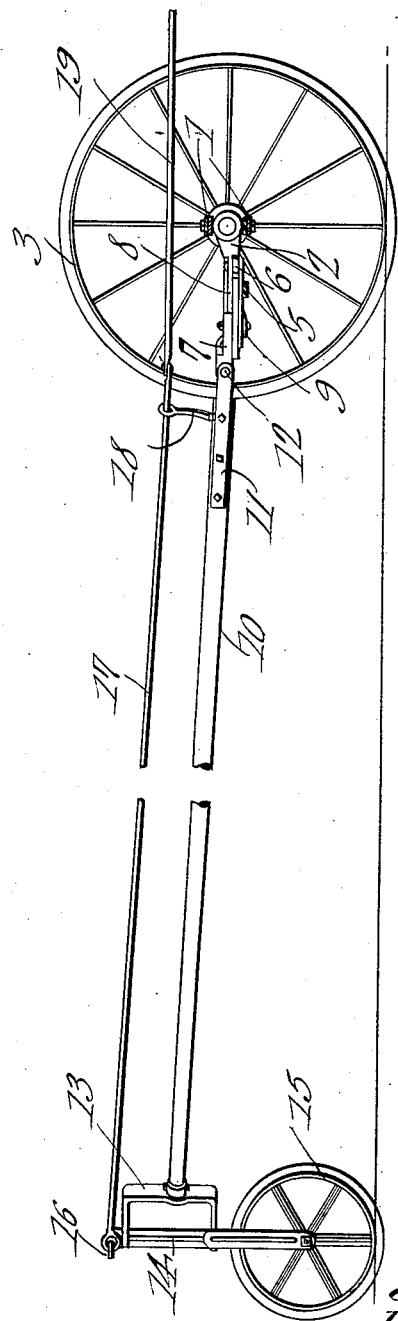

UNITED STATES PATENT OFFICE.

JAMES A. FRASER, IRA E. FRASER, AND WILLIAM R. FRASER, OF MITCHELL, SOUTH DAKOTA.

STEERING DEVICE FOR TRACTION-ENGINES.

1,097,174.  Specification of Letters Patent.  Patented May 19, 1914.

Application filed May 22, 1913. Serial No. 769,338.

*To all whom it may concern:*

Be it known that we, JAMES A. FRASER, IRA E. FRASER, and WILLIAM R. FRASER, citizens of the United States, residing at Mitchell, in the county of Davison, State of South Dakota, have invented a new and useful Steering Device for Traction-Engines, of which the following is a specification.

The present invention appertains to a steering device for traction engines, and aims to provide a novel and improved mechanism of that character.

One of the objects of the present invention is to provide a tongue attachable to the knuckle or stub shaft of one of the steering wheels of a traction engine, and having a guiding or steering wheel at its forward end adapted to be swung so as to direct the tongue to one side or the other to thereby swing the knuckle and steering wheel carried thereby, it being understood that the other knuckle and steering wheel are moved with the said knuckle by means of a connecting rod.

Another object of the present invention is to provide a steering device of the character indicated which shall meet the demands necessary, and which may conform to the various conditions arising in its use.

A further object of the present invention is to provide a device of the nature indicated, which is comparatively simple, substantial, and inexpensive in construction, and which shall be convenient, serviceable and efficient in its use.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the steering device as applied to one of the steering knuckles of a traction engine, a fragmental portion of the traction engine only being shown and a portion of the steering device being broken away. Fig. 2 is a side elevation of the several parts illustrated in Fig. 1.

Referring specifically to the drawing, the numeral 1 designates the front axle of a traction engine, having the usual steering knuckle or stub axle 2 pivoted to the end thereof, it being understood, of course, that a steering knuckle is pivoted to each end of the axle, as is customary. The steering knuckle 2 has the steering wheel 3 journaled on the pintle thereof, and embodies the arm 4 to which the connecting rod 5 of the two knuckles is pivotally connected. The knuckle 2 also embodies the second arm 6, to which a steering rod is usually connected, although in the present case, the steering rod is not so connected, but on the other hand, it is connected to the steering wheel carried by the tongue, as will hereinafter more fully appear.

The foregoing parts are common in traction engines and other motor propelled vehicles, and need not be described at length, it being understood that the present device is applicable to the steering knuckle of various motor propelled vehicles.

In carrying out the present invention, a bracket 7 is secured rigidly to the knuckle 2, the bracket having a rearwardly projecting arm 8 bolted to the arm 6 of the knuckle, it being understood that the steering rod is detached from the said arm 6, and a brace 9 is bolted or otherwise attached to the arm 4 of the knuckle to which the connecting rod 5 is connected, while the other end of the brace 9 is bolted or otherwise secured to the bracket 7 at the butt end of the arm 8. The bracket 7 is thus firmly attached to the steering knuckle so that the bracket and steering knuckle will turn or swing together or consonantly.

A tongue 10 of suitable length, and preferably constructed of tubular stock, is attached at its rear end to the bracket 7, strips or bars 11 being bolted to the rear end of the tongue 10 and protruding beyond the end of the tongue to provide a fork which is pivoted to a bolt or pivot member 12 carried by the bracket 7. The bolt or pivot member 12 is disposed horizontally in order that the tongue 10 may swing vertically, but not horizontally, relative to the bracket 7.

The forward or free end of the tongue 10 carries a forked bracket 13, the arms of which are superposed, and a steering post 110

14 is journaled through the arms of the fork 13 and carries a steering or guiding wheel 15 adapted to engage the soil. The steering post or shaft 14 carries a laterally projecting arm or lever 16 at its upper end, to which is connected a rod or link 17. A guide arm 18 is secured to the rear end of the tongue 10 and projects upwardly therefrom to guide the rear end of the rod or link 17.

The steering rod has been designated by the numeral 19, the same being connected to the hand wheel or hand lever of a traction engine (not shown), the steering rod 19 being loosely or pivotally connected with the rear end of the link 17, in order that when the steering wheel or hand lever is moved, the motion will be transmitted to the supplemental or auxiliary steering wheel 15.

The present attachment may be readily constructed or manufactured and applied to the steering knuckle of a traction engine or other motor propelled vehicle, as will be evident.

In use, as the steering wheel or hand lever of a traction engine is moved to steer the engine or vehicle, the motion will be transmitted through the medium of the link 17 and the lever 16 to the steering post 14, in order to turn the supplemental steering wheel 15, which in engaging the soil, will cause the tongue 10 to be directed to one side or the other to thereby turn the steering knuckle and consequently the steering wheels of the engine or vehicle. The supplemental steering wheel 15 may be easily turned, the leverage provided by the tongue 10 permitting the steering wheels of the vehicle to be effectively turned, as desired, it not being necessary for the operator to turn the steering wheels directly, which is sometimes difficult and cumbersome. The joint between the steering rod 19 and the link 17 is disposed adjoining the bolt or pivot pin 12, it being noted that the tongue may swing vertically due to any unevenness in the surface of the soil, the link 17 swinging with the tongue. The supplemental steering wheel 15 may also be disposed in line with the steering wheel 3, or slightly to one side or the other of the steering wheel, as may be seen fit, to assist in properly guiding the engine or vehicle.

From the foregoing, taken in connection with the drawing, the advantages and capabilities of the present device or attachment will be apparent to those versed in the art, and need not be described at length, it being noted that the objects aimed at have been carried out satisfactorily, and that the device provides a desirable one for the purposes for which it is designed.

Having thus described the invention, what is claimed as new is:—

In combination with a steering knuckle and steering rod of a vehicle, a bracket attached to the knuckle, a tongue pivoted to the bracket to swing vertically, a steering post carried by the tongue, a steering wheel carried by the post, an upstanding guide carried by the rear end of the tongue, and a link connecting the steering post and steering rod and guided by the said guide, the joint between the steering rod and link being disposed adjoining the pivotal point of the tongue.

In testimony that we claim the foregoing as our own, we have hereto affixed our signatures in the presence of two witnesses.

JAMES A. FRASER.
IRA E. FRASER.
WILLIAM R. FRASER.

Witnesses:
JAMES A. GRACE,
BERT N. BEAUMONT.

Copies of this patent may be obtained for five cents each, by addressing the "Commissioner of Patents, Washington, D. C."